June 21, 1966  F. D. KNOBLOCK  3,256,840
FOLDING TYPEWRITER TABLES
Original Filed Feb. 6, 1962  5 Sheets-Sheet 1

INVENTOR.
FREDERICK D. KNOBLOCK
BY
Barnes, Kisselle, Raisch & Choate
ATTORNEYS

June 21, 1966 F. D. KNOBLOCK 3,256,840
FOLDING TYPEWRITER TABLES
Original Filed Feb. 6, 1962 5 Sheets-Sheet 2

INVENTOR.
FREDERICK D. KNOBLOCK
BY
Barnes, Kisselle, Raisch & Choate
ATTORNEYS

INVENTOR.
FREDERICK D. KNOBLOCK
BY
ATTORNEYS

June 21, 1966  F. D. KNOBLOCK  3,256,840
FOLDING TYPEWRITER TABLES
Original Filed Feb. 6, 1962  5 Sheets-Sheet 4
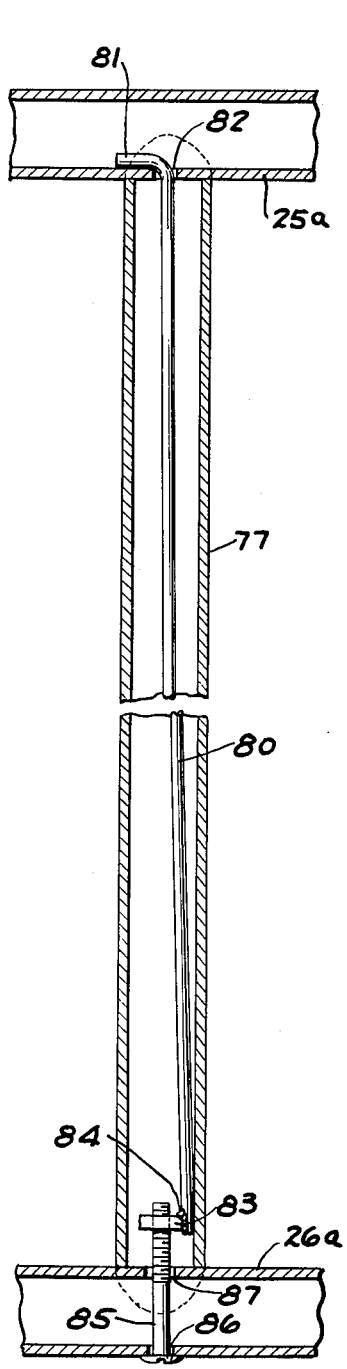
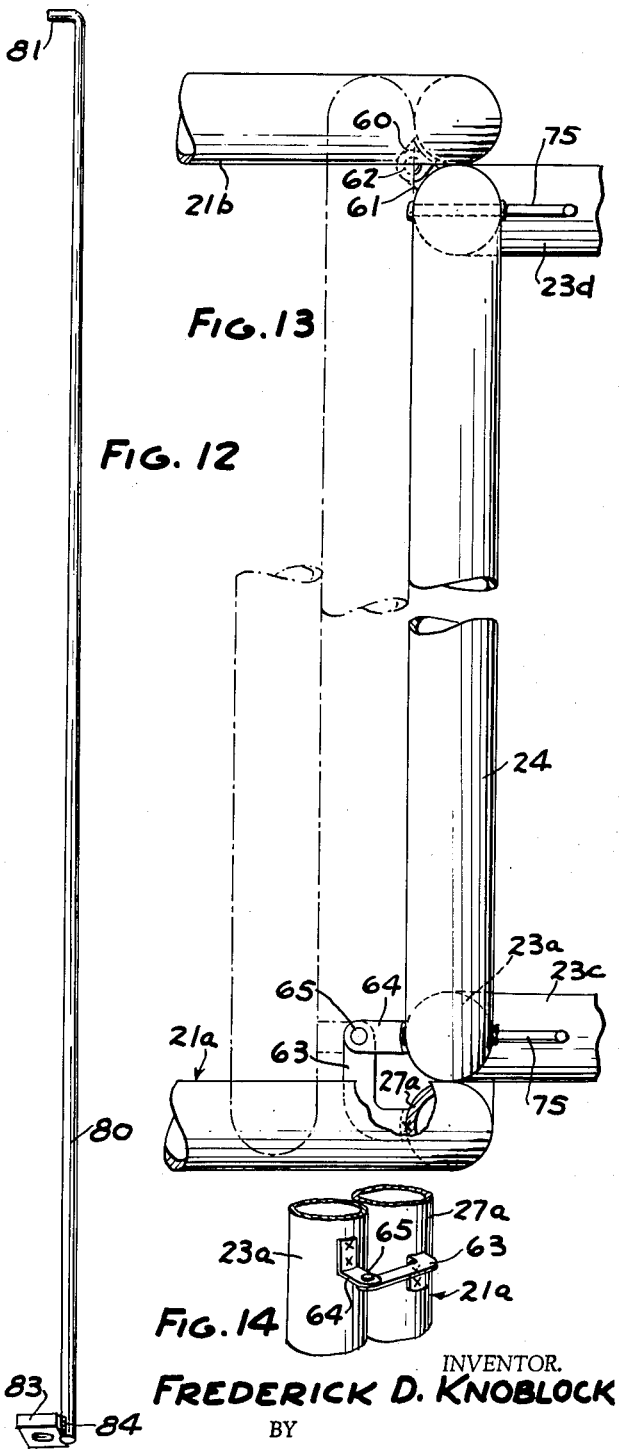
INVENTOR.
FREDERICK D. KNOBLOCK
BY
Barnes, Kisselle, Rausch & Choate
ATTORNEYS June 21, 1966 F. D. KNOBLOCK 3,256,840
FOLDING TYPEWRITER TABLES
Original Filed Feb. 6, 1962 5 Sheets-Sheet 5

INVENTOR.
FREDERICK D. KNOBLOCK
BY

ATTORNEYS

United States Patent Office 3,256,840
Patented June 21, 1966

3,256,840
FOLDING TYPEWRITER TABLES
Frederick D. Knoblock, 8 Shadow Lane,
Bloomfield Hills, Mich.
Continuation of application Ser. No. 171,457, Feb. 6, 1962. This application Sept. 8, 1964, Ser. No. 395,087
5 Claims. (Cl. 108—124)

This application is a continuation of my copending application Serial No. 171,457, filed February 6, 1962, now abandoned.

This invention relates to folding tables and particularly to folding tables of the type which are adapted to support heavy loads such as typewriters.

In the patent to Frederick D. Knoblock and Albert C. Koett 2,902,325, titled Folding Support Base for Table Top, issued September 1, 1959 and in my Patent 3,108,550, issued October 29, 1963, titled Folding Table, of which this application is a continuation-in-part, there are disclosed folding tables of the type which are readily folded into flat compact form for storage and which can be unfolded and erected without the use of tools.

In Patent 2,902,325, there is disclosed a foldable base on which a tray or table top is adapted to rest which comprises side members each made of a single length of elongated tubing and having a U-shape. Each side member is positioned so that the lower arm is adapted to rest upon the floor and the upper arm is adapted to support the table top. The members are spaced apart with their bight portions extending vertically. A main frame member comprising a single length of elongated tubing of inverted U-shape is provided with the legs thereof parallel to the bight portions of the side members. The bight portions of the side members are adapted to be folded into compact relationship adjacent the main frame member. In the folding table shown in Patent 2,902,325, the table top is adapted to rest on the cross or bight portion of the main frame member and the upper arms of the side members. Although such a construction is suitable for most purposes, it has the disadvantage in that the table top may be inadvertently disengaged or moved upwardly. This is particularly undesirable in the case where the table is used to support a typewriter since the typewriter may be caused to fall to the floor resulting in damage to the typewriter.

In my Patent 3,108,550 novel hinge means are provided for hinging the main frame member to the side members. In addition, the table top is releasably hinged to the cross portion and the upper arms of the side members. Although such a construction is more suitable for preventing the table top from inadvertently being displaced relative to the frame members, the releasable means shown in my Patent 3,108,550 are subject to the disadvantage in that a substantial upward force will disengage the table top from the frame members. This is, of course, of a disadvantage in supporting heavy loads such as typewriters.

It is therefore an object of this invention to provide a folding table for heavy loads, such as typewriters, wherein the table top cannot be inadvertently disengaged particularly adjacent the user.

It is a further object of the invention to provide such a folding table wherein there is a positive lock between the table top and the frame members.

It is a further object of the invention to provide such a folding table which is relatively inexpensive.

It is a further object of the invention to provide such a folding table which has novel strut reinforcing means.

Basically, the invention comprises providing axially and side members and yieldable releasable means between the table top and the free ends of the upper arms of the side members and yieldable releasable means between the table top and the cross portion of the main frame member. By this arrangement, any tendency to provide an upward lifting force on the table top, as for example, by an upward movement of the knees of the user, will not disengage the table top from the arms in the side members. However, when it is desired to remove the table top for folding the table, the releasable means associated with the cross portion of the main frame member can be readily disengaged to permit removal of the table top.

In order to provide additional stability to the table, novel strut means are provided which include tubular members that require no welding. The members have substantially straight rods therein, one end of each rod being hooked into an opening in one tubular member with which the brace is associated and the other end of the rod having a nut fastened thereto into which a bolt is threaded after passing through the other tubular member with which the brace member is associated.

In the drawings:

FIG. 11 is a fragmentary sectional view taken along the line 11—11 in FIG. 8.

FIG. 12 is a perspective view of a portion of the structure shown in FIG. 11.

FIG. 13 is a fragmentary plan view of the table shown in FIG. 8 with the table top removed.

FIG. 14 is a fragmentary perspective view of the hinge shown in FIGS. 8 and 13.

Figure 1:
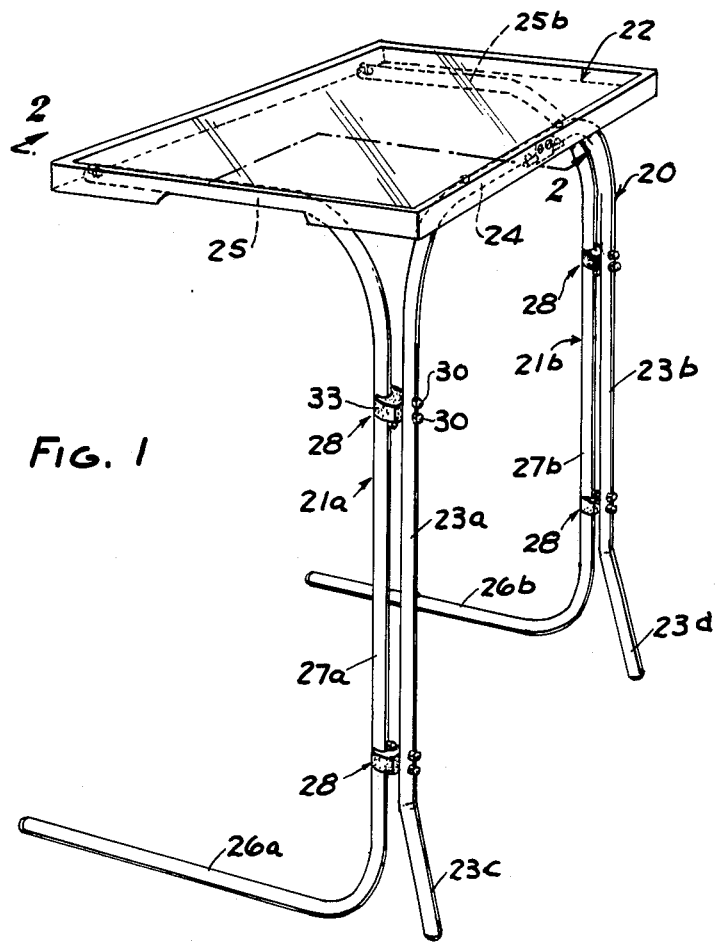
FIG. 1 is a perspective view of a folding table embodying the invention.

Referring to FIG. 1, the folding table comprises four elements, namely, a main frame member 20, side frame members 21a, 21b, and a tray 22. Main frame member 20 is made of a single length of tubing and has an inverted U-shape comprising generally vertical legs 23a, 23b connected by a horizontal cross or bight portion 24. Each side member 21a, 21b is also made of a single length of tubing and comprises horizontal legs 25a, 25b, 26a, 26b connected by a vertical cross or bight portion 27a, 27b. Longitudinally spaced hinges 28 pivot each side member 21a, 21b to the vertical legs 23a, 23b of the main frame member 20 for swinging movement about the axis of vertical bight portions 27a, 27b. Each hinge 28 comprises a block, preferably of plastic material, which is fixed to a vertical leg 23a by a pair of bolts 30 extending through spaced openings in the leg 23a, 23b. Each block 28 comprises a pair of spaced flexible fingers 33 that are snapped over the bight portion 27a, 27b of the adjacent side members 21a, 21b so that the side members 21a, 21b are hinged to the blocks 28 and, in turn, the main frame member 20. The use of the plastic 28 not only permits the hinge to be disconnected but, in addition, provides for a freely pivoted hinge. By this arrangement, each side member 21a, 21b is adapted to swing about an axis parallel to the axis of the legs 23a, 23b of the main frame 20.

The bight portion 24 of the main frame member 20 is bent intermediate its end nearer one leg 23b than the other leg 23a. The extent of the bent portion is such that the one leg 23b lies in a plane with side member 21a when the table is in folded condition. When the side member 21a is brought into this folded position, the other side member 21b can then be pivoted to bring its plane into parallelism with the first side member 21a. In the unfolded condition, the planes of the side members 21a, 21b are parallel with the lower legs 26a, 26b of side members engaging the floor. The lower ends 23c, 23d of main frame member 20 extend forwardly and engage the floor. The aforementioned construction is shown and described in my aforementioned Patent 3,108,550.

Figure 2:
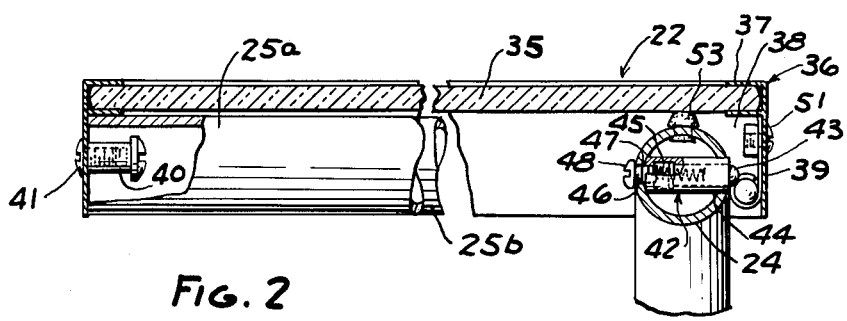
FIG. 2 is a fragmentary sectional view taken along the line 2—2 in FIG. 1.
Figure 5:
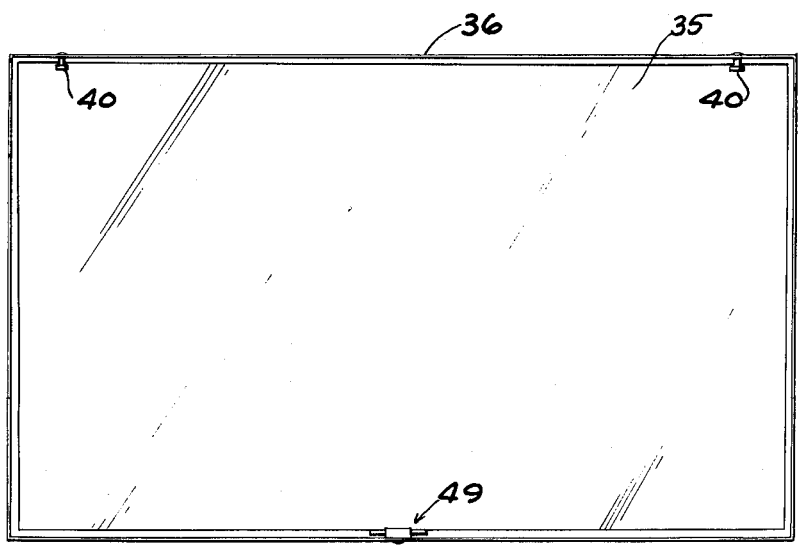
FIG. 5 is a plan view of the underside of the table top shown in FIG. 1 after it is removed.

Referring to FIGS. 2 and 5, tray 22 is adapted to be supported on upper arms 25a, 25b and cross portion 24 when the table is unfolded. Tray 22 comprises a substantially flat panel 35 of glass, plastic, wood or similar material surrounded by a frame 36. Frame 36 includes inwardly extending lips 37, 38 integral with the frame and supporting the panel 35. In addition, frame 36 includes a downwardly extending flange 39 within the confines of which cross portion 24 and upper arms 25a, 25b are adapted to extend when the table is in unfolded position.

Figure 3:
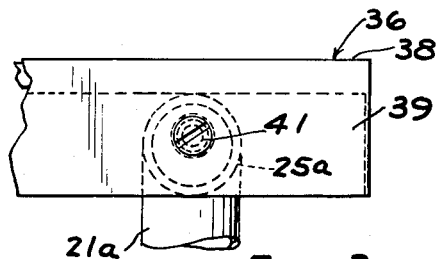
FIG. 3 is a fragmentary end view taken from the left of FIG. 2.

As shown in FIG. 5, the frame 36 is rectangular and includes a pair of inwardly extending pins 40 along one side thereof. The pins 40 are adapted to engage the open ends of the tubular arms 25a, 25b (FIGS. 1 and 2). Each pin 40 is tubular and is held in position on the flange portion 39 by a screw 41 extending through an opening in the flange portion and threaded into the tubular pin 40 (FIGS. 2 and 3).

Figure 4:
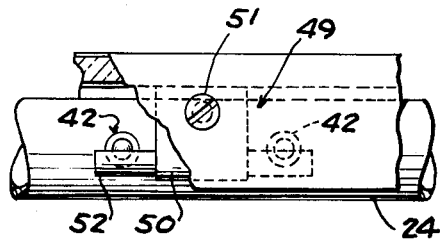
FIG. 4 is a fragmentary end view taken from the right of FIG. 2.

Cross portion 24 is provided with a pair of spaced yieldable detents 42 adjacent the mid portion thereof (FIGS. 1, 2 and 4). Each detent 42 includes a pin 43 that is telescopically received in a tubular housing 44 that is positioned generally horizontally in cross portion 24. Pin 43 is yieldingly urged outwardly by a coil spring 45. The outward movement of the pin 43 is limited by an extension 46 that passes through an opening 47 in cross portion 24 and has a head 48 that engages the outer surface of the cross portion to limit the movement of the pin 43 outwardly relative to the cross portion. A detent member 49 is mounted on table top 22 and is adapted to move past the pins 43. Detent member 49 is mounted on the flange 39 of frame 36 which is adjacent the cross portion 24. As shown in FIGS. 2, 4 and 5, detent member 49 comprises a sheet metal member 50 held on the flange 39 by a nut and bolt 51 and includes a portion that is turned over to hold a rod 52. The ends of the rod extend laterally so that they are adapted to engage and move past the pins 43 when the tray is mounted on the frame member.

In order to mount the table top 22 on the frame member, the side members are first unfolded to the position shown in FIG. 1 and the tray 22 is brought into position engaging the pins 40 with the open ends of the arms 25a, 25b. The front end of the table top 22 is then swung downwardly moving the ends of the rod 52 past the detent pins 43 and thereby locking the folded end of the table top in position. Rubber or plastic pads 53 can be provided at spaced points along the length of the cross portion 24 at the top thereof to engage the underside of the top panel 35.

When the table is thus in unfolded condition, a typewriter or other heavy object may be placed in the table top 22 and the user can then proceed to work without danger or accidentally disengaging the table top from the frame members. The pin 40 prevents the rear of the table top 22 from becoming disengaged from the side arms 25a, 25b by any inadvertent lateral or upward movement such as might occur due to the movement of the knees of the user.

In order to remove the table top, it is only necessary to hold the frame members and lift on the front end of the table top 22, moving the rod 52 past the detent pins 43 and disengaging the forward end of the table top from the frame member. The rear end of the table top may be then disengaged by moving the table top rearwardly relative to the arms 25a, 25b to disengage the pins 40 from the ends of the arms 25a, 25b.

Figure 6:
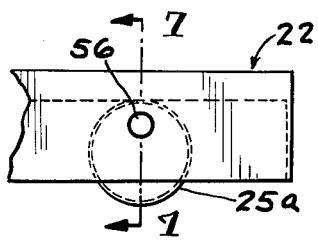
FIG. 6 is a view similar to FIG. 3 of a modified form of the invention.
Figure 7:
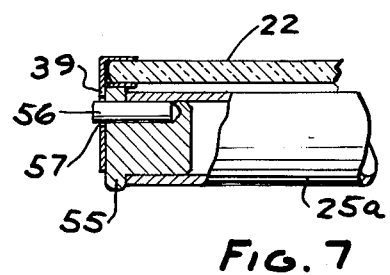
FIG. 7 is a fragmentary sectional view taken along the line 7—7 in FIG. 6.

Although the construction shown in FIGS. 1 to 5 is relatively inexpensive and simple, the pins may be placed in the ends of the arms 25a, 25b and cooperate with openings in the frame, as shown in FIGS. 6 and 7. Plugs 55 of plastic or the like are positioned in the open ends of the arms 25a, 25b and a pin 56 is mounted in each plug adjacent the upper edge of the arm 25a. The pin 56 is adapted to engage an opening 57 in the rear portion of the flange 39 of frame 36 of table top 22. This form of table top is engaged and disengaged in the same manner as described with regard to FIGS. 1 and 5.

A modified form of folding table is shown in FIGS. 8–10 and 13–14 wherein main frame member 20 and side members 21a, 21b are permanently hinged to one another by fixed hinges that comprise projecting arms 60, 61 on leg 23b and bight portion 27b, respectively, that are hinged to one another by rivet 62 and projecting arms 63, 64 on the vertical bight portion 27a and leg 23a, respectively, which are hinged to one another by a rivet 65 (FIG. 14). The projecting arms 60, 61 are substantially identical to the arms 63, 64 except that the arms 63, 64 are longer so that when the side member 21b is folded into position adjacent the main frame member 20, the side member 21a may thereafter be folded in position adjacent the side member 21b, as shown in dotted lines in FIG. 13.

Figure 8:
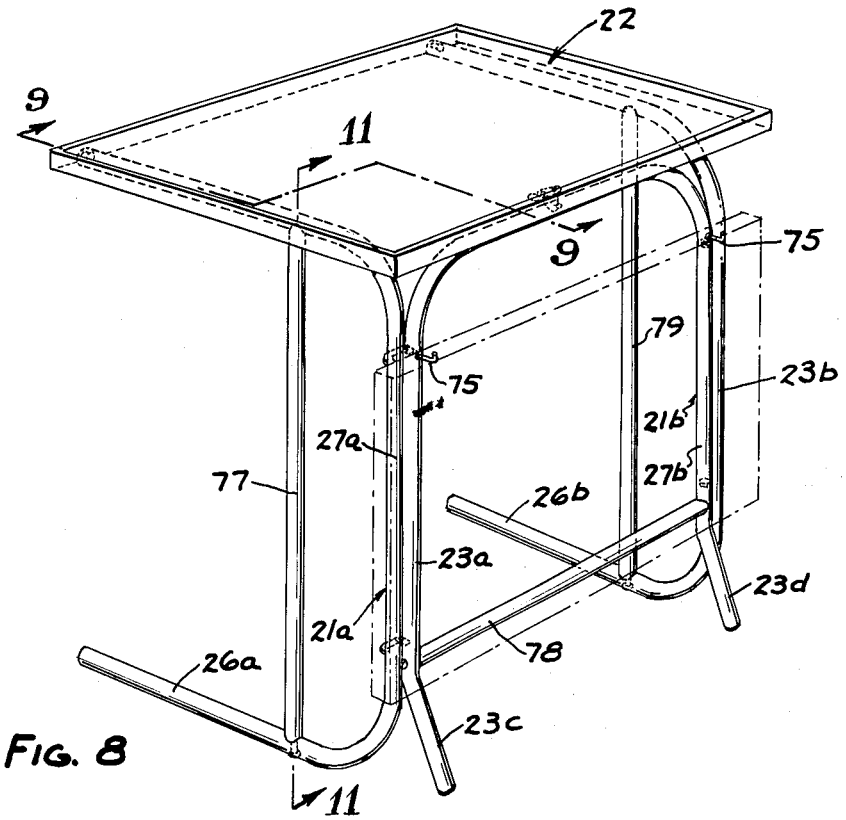
FIG. 8 is a perspective view of a modified form of folding table.
Figure 9:
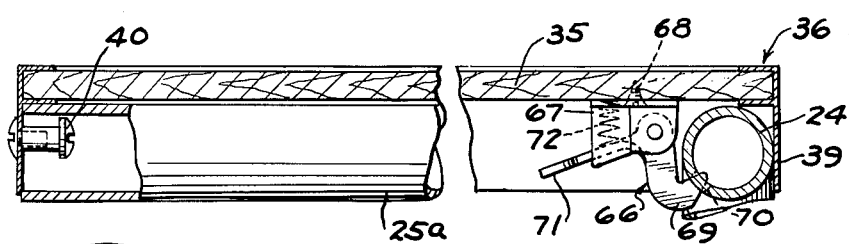
FIG. 9 is a fragmentary sectional view taken along the line 9—9 in FIG. 8.
Figure 10:
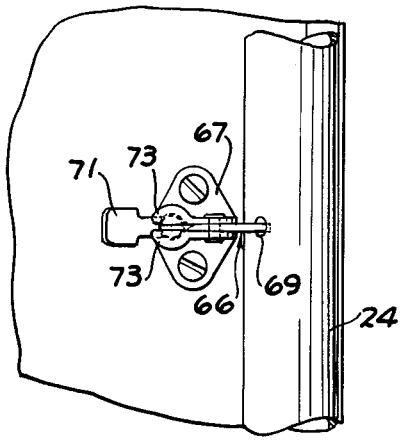
FIG. 10 is a fragmentary view looking upwardly on the right hand portion of FIG. 9.

The folding table in FIG. 8 includes, in addition pins 40 that engage the open ends of the arms 25a, 25b. Latch means positively lock the forward end of the table top 22 to the cross portion 24 of the frame member. As shown in FIGS. 9 and 10, the latch means comprise latch 66 pivoted to a bracket 67 fixed to the under side of the top panel 35 of the table top by screws 68. Latch 66 is formed with a hook 69 that is adapted to releasably engage an opening 70 in the cross portion 24 of main frame member 20. Latch 66 also includes a portion forming thumb lever 71 that is adapted to be depressed to release the hook 69 from the opening 70. A coil spring 72 is interposed between the bracket 67 and the thumb lever 71 to yieldingly urge the hook 69 into engagement with the opening 70. Portions 73 of the bracket are engaged by thumb lever 71 to limit the outward movement of the latch 66.

In the form of invention shown in FIGS. 8–10, the table top 22 is applied to the frame member in a substantially similar manner to that shown in FIGS. 1 to 5. After the pins 40 are hooked in the open ends of the tubular arms 25a, 25b, the downward movement of the forward edge of the table top 22 causes the hook 69 to be urged outwardly and pass around the tubular portion 24 into engagement with the opening 70. In this form, inadvertent displacement of the front edge of the table top 22 positively is prevented so that the table top will not be disengaged until the thumb lever 71 is depressed. A further advantage of this form of construction, is that the latch 66 is mounted on a panel 35 removing strain from the frame 36.

In the form of the invention shown in FIG. 8, hooks 75 are provided adjacent the upper end of the legs 23a, 23b and are adapted to engage openings in the flange 39 to support the table top 22 when the table is folded, as shown in dotted lines.

In order to provide additional stability to the table for use, for example, to support a typewriter, brace members 77, 78 and 79 are provided between the upper and lower arms of the side members and the legs of the main frame member. Each of the braces 77, 78, 79 is of substantially identical construction and, for purposes of clarity, only one will be described.

Referring to FIGS. 11 and 12, each brace is of tubular construction and the ends thereof are cut to conform to the outer contour of the members 25a, 26a with which the tubular member is associated. A substantially straight rod 80 is provided within the tubular member and includes a turned over or hooked end 81 that passes through an opening 82 in the member 25a. A nut 83 is welded to the lower end of the rod 80 as at 84. A bolt 85 passes through aligned openings 86, 87 in the lower arm 26a and is threaded into the nut 83. By tightening the bolt 85, the rod 80 is pulled downwardly causing the hook 81 to engage the inner surface of the member 25a to pull the members 25a, 26a toward one another and positively lock the brace 77 in position. In this manner, a brace is provided which requires no welding and can be assembled with a minimum amount of labor and use of tools. As pointed out above, the braces 78, 79 are of identical construction to brace 77.

Figure 15:
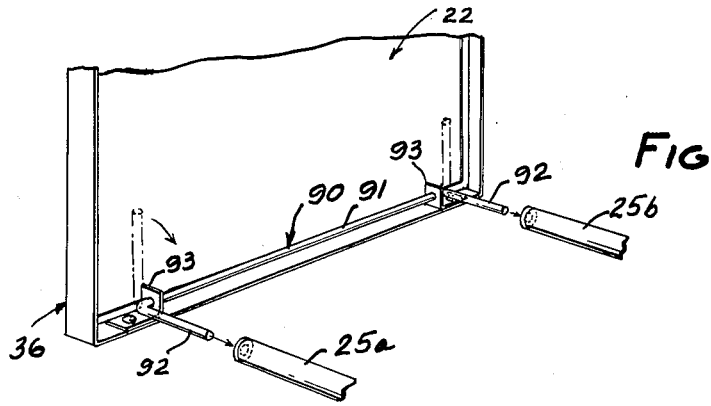
FIG. 15 is a fragmentary exploded perspective view of a further modified form of folding table.
Figure 16:
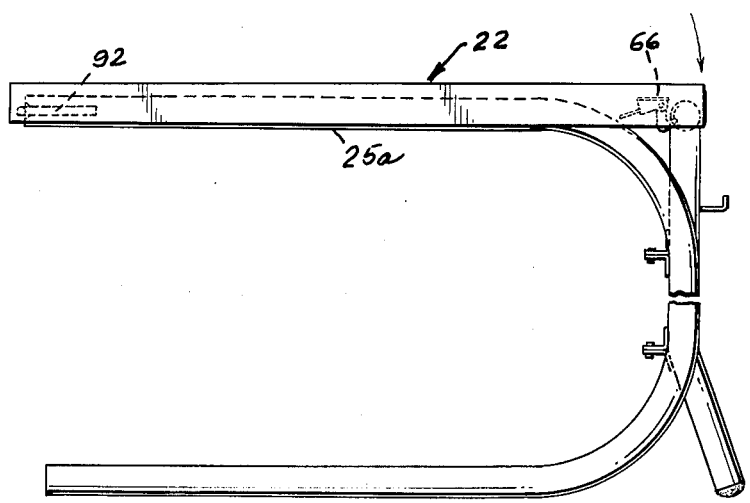
FIG. 16 is a fragmentary side elevation of the table shown in FIG. 15.
Figure 17:
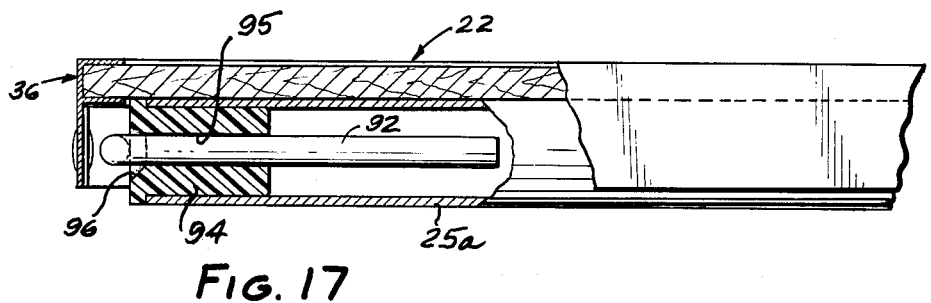
FIG. 17 is a fragmentary sectional view on an enlarged scale of a portion of the table shown in FIG. 16.

Referring to FIGS. 15–17, in this form of folding table, the pins 40 of the form of the invention shown in FIGS. 8–10 have been replaced with a U-shaped bar 90 including a base 91 and legs 92. The bar 90 is hinged to table top 22 by angle brackets 93 fixed to the frame 36, the base 91 of the bar member 90 extending through openings in the brackets 93. Plastic plugs 94 are provided in the ends of the upper arms 25a, 25b. Each plug includes a centrally extending opening 95 and a beveled edge 96.

When it is desired to apply the table top 22 on the arms 25a, 25b, the table top is swung to a generally vertical position as shown in FIG. 15 so that the legs 92 remain substantially horizontal. The table top is then moved bodily toward the arms 25a, 25b to engage the legs 92 with the openings 95. The table top 22 is then swung downwardly engaging latch 66 as in the form of the invention shown in FIGS. 8–10.

It can thus be seen that I have provided a folding table which is particularly adapted to support heavy loads and includes novel means for preventing inadvertent removal of the table top and novel brace means.

What I claim is:

1. A folding table comprising a U-shaped single piece tubular main frame member having two substantially vertical leg portions and a connecting cross portion at the top thereof, two one piece tubular side members, each side member having a U-shape comprising a lower arm for resting horizontally on a floor, an upper arm substantially parallel to the lower arm, the arms of each side member being connected by vertically extending portions, said vertically extending portions being disposed respectively in close proximity to and parallel to the two legs of the main frame member, means for pivotally connecting said vertical portions of the side members respectively to the two legs of the main frame member, said one side member being pivoted to the main frame member so that it may be folded flat against the main frame member, the other side member being pivoted to said main frame member so that it may be folded flat against the one said folded side member, and a rectangular table top adapted to rest on the cross portion and the upper arms, said table top comprising a rectangular top panel and a peripheral frame having a downwardly extending flange portion into which the cross portion and upper arms extend, axially and horizontally engageable means between the flange portion of the frame and the ends of the upper arms, said last mentioned means comprising a U-shaped bar having a base and legs, means for pivoting said bar to said peripheral frame for swinging movement from a position wherein the legs are parallel to the table top to a position wherein the legs engage the peripheral frame, said upper arms being provided with plugs having openings therein adapted to be engaged by said legs, and releasable locking means between the cross portion and the table top.

2. A folding table comprising a U-shaped single piece tubular main frame member having two substantially vertical leg portions and a connecting cross portion at the top thereof, two one piece tubular side members, each side member having a U-shape comprising a lower arm for resting horizontally on a floor, an upper arm substantially parallel to the lower arm, the arms of each side member being connected by vertically extending portions, said vertically extending portions being disposed respectively in close proximity to and parallel to the two legs of the main frame member, means for pivotally connecting said vertical portions of the side members respectively to the two legs of the main frame member, said one side member being pivoted to the main frame member so that it may be folded flat against the main frame member, the other side member being pivoted to said main frame member so that it may be folded flat against the one said folded side member, and a table top adapted to rest on the cross portion and the upper arms, said table top comprising a top panel, axially and horizontally engageable means between the table top and the ends of the upper arms, said last mentioned means comprising a pair of legs, means for pivoting each leg to said table top for swinging movement from a position wherein each leg is parallel to the table top to a position wherein each leg is at an angle to said table top, said upper arms being provided with openings therein adapted to be engaged by said legs, and releasable locking means between the cross portion and the table top.

3. A folding table comprising a U-shaped single piece tubular main frame member having two substantially vertical leg portions and a connecting cross portion at the top thereof, two one piece tubular side members, each side member having a U-shape comprising a lower arm for resting horizontally on a floor, an upper arm substantially parallel to the lower arm, the arms of each side member being connected by vertically extending portions, said vertically extending portions being disposed respectively in close proximity to and parallel to the two legs of the main frame member, means for pivotally connecting said vertical portions of the side members respectively to the two legs of the main frame member, said one side member being pivoted to the main frame member so that it may be folded flat against the main frame member, the other side member being pivoted to said main frame member so that it may be folded flat against the one said folded side member, and a table top adapted to rest on the cross portion and the upper arms, said table top comprising a rectangular top panel, axially and horizontally engageable means between the table top and the ends of the upper arms, said last mentioned means comprising a U-shaped bar having a base and legs, means for pivoting said bar to said table top for swinging movement from a position wherein the legs are parallel to the table top to a position wherein the legs are at an angle to the table top, said upper arms being provided with openings therein adapted to be engaged by said legs.

4. A folding table comprising a main frame member having a connecting cross portion at the top thereof, two side members, each side member comprising an upper arm, and a rectangular table top adapted to rest on the cross portion and the upper arms, said table top comprising a rectangular top panel and a peripheral frame having a downwardly extending flange portion into which the cross portion and upper arms extend, axially and horizontally engageable means between the flange portion of the frame and the ends of the upper arms, said last mentioned means comprising a U-shaped bar having a base and legs, means for pivoting said bar to said peripheral frame for swinging movement from a position wherein the legs are parallel to the table top to a position wherein the legs engage the peripheral frame, said upper arms having openings therein adapted to be engaged by said legs.

5. A folding table comprising a U-shaped single piece tubular main frame member having two substantially vertical leg portions and a connecting cross portion at the top thereof, two one piece tubular side members, each side member having a U-shape comprising a lower arm for resting horizontally on a floor, an upper arm substantially parallel to the lower arm, the arms of each side member being connected by vertically extending portions, said vertically extending portions being disposed respectively in close proximity to and parallel to the two legs of the main frame member, means for pivotally connecting said vertical portions of the side members respectively to the two legs of the main frame member, said one side member being pivoted to the main frame member so that it may be folded flat against the main frame member, the other side member being pivoted to said main frame member so that it may be folded flat against the one said folded side member, and a table top adapted to rest on the cross portion and the upper arms, said table top comprising a top panel, axially and horizontally engageable means between the table top and the ends of the upper arms, said last mentioned means comprising a pair of legs, means for pivoting each leg to said table top for swinging movement from a position wherein each leg is parallel to the table top to a position wherein each leg is at an angle to said table top, said upper arms being provided with openings therein adapted to be engaged by said legs.

References Cited by the Examiner

UNITED STATES PATENTS

| | | | |
|---|---|---|---|
| 2,692,175 | 10/1954 | Jacques | 108—124 |
| 2,703,742 | 3/1955 | Backer | 108—56 |
| 2,729,279 | 1/1956 | Axtell et al. | 108—157 |
| 2,857,227 | 10/1958 | Jacques | 108—124 |
| 2,860,020 | 11/1958 | Nickliss et al. | 108—124 |
| 2,873,156 | 2/1959 | Botnick | 108—124 |
| 2,887,348 | 5/1959 | Sadowsky | 108—124 |
| 2,902,325 | 9/1959 | Knoblock et al. | 248—167 |
| 2,968,338 | 1/1961 | Reese | 108—11 |
| 3,108,550 | 11/1963 | Knoblock | 108—124 |

FRANK B. SHERRY, *Primary Examiner.*

G. O. FINCH, *Assistant Examiner.*